United States Patent
Schulz et al.

(10) Patent No.: US 12,533,793 B2
(45) Date of Patent: Jan. 27, 2026

(54) ROBOT FOR DETECTING AND PICKING UP AT LEAST ONE PREDETERMINED OBJECT

(71) Applicant: ANGSA ROBOTICS GMBH, Munich (DE)

(72) Inventors: Karl Schulz, Munich (DE); Bilal Tariq, Vaterstetten (DE); Lukas Wiesmeier, Oberhaching (DE)

(73) Assignee: ANGSA ROBOTICS GMBH, Munich (DE)

( * ) Notice: Subject to any disclaimer, the term of this patent is extended or adjusted under 35 U.S.C. 154(b) by 219 days.

(21) Appl. No.: 18/275,350

(22) PCT Filed: Feb. 2, 2022

(86) PCT No.: PCT/EP2022/052441
§ 371 (c)(1),
(2) Date: Aug. 1, 2023

(87) PCT Pub. No.: WO2022/167468
PCT Pub. Date: Aug. 11, 2022

(65) Prior Publication Data
US 2024/0131690 A1  Apr. 25, 2024
US 2024/0227169 A9  Jul. 11, 2024

(30) Foreign Application Priority Data
Feb. 3, 2021  (DE) ............... 10 2021 200 989.1

(51) Int. Cl.
B25J 9/02    (2006.01)
B25J 9/16    (2006.01)
B25J 15/06   (2006.01)

(52) U.S. Cl.
CPC ............. *B25J 9/026* (2013.01); *B25J 9/1612* (2013.01); *B25J 9/162* (2013.01); *B25J 9/1697* (2013.01); *B25J 15/0616* (2013.01)

(58) Field of Classification Search
None
See application file for complete search history.

(56) References Cited

U.S. PATENT DOCUMENTS

| | | | |
|---|---|---|---|
| 6,671,582 | B1 | 12/2003 | Hanley |
| 11,534,923 | B1 * | 12/2022 | De Arruda Camargo Polido ....... B25J 9/1674 |
| 2019/0271125 | A1 | 9/2019 | Fornarotto |

(Continued)

FOREIGN PATENT DOCUMENTS

| CA | 3113358 A1 | 4/2020 |
|---|---|---|
| DE | 102018132964 A1 | 6/2020 |

(Continued)

OTHER PUBLICATIONS

International Search Report from PCT/EP2022/052441; mailed Jun. 22, 2022 In German and English (5 pages).

*Primary Examiner* — Arslan Azhar
(74) *Attorney, Agent, or Firm* — Fitch, Even, Tabin & Flannery, LLP

(57) ABSTRACT

A robot configured to recognize and pick up at least one predetermined object, the robot being configured in such a manner that the predetermined object is recognized and picked up in a work space below the robot. The robot may have an end effector and an adjusting unit for picking up the predetermined object. The end effector and the adjusting unit are disposed in the work space below the robot.

9 Claims, 3 Drawing Sheets

(56) References Cited

U.S. PATENT DOCUMENTS

| | | |
|---|---|---|
| 2020/0150696 A1 | 5/2020 | Womble |
| 2021/0237260 A1 | 8/2021 | Holopainen et al. |
| 2021/0337734 A1 | 11/2021 | Jeanty et al. |
| 2022/0097236 A1* | 3/2022 | Bellinger .............. A47L 9/2852 |
| 2024/0246118 A1* | 7/2024 | Taalas ................... B25J 9/0093 |

FOREIGN PATENT DOCUMENTS

| | | |
|---|---|---|
| WO | 2019215384 A1 | 11/2019 |
| WO | 2022038057 A1 | 2/2022 |
| WO | 2022090627 A1 | 5/2022 |

* cited by examiner

ROBOT FOR DETECTING AND PICKING UP AT LEAST ONE PREDETERMINED OBJECT

CROSS-REFERENCE TO RELATED APPLICATIONS

This application is a U.S. national phase application filed under 35 U.S.C. § 371 of International Application No. PCT/EP2022/052441, filed on Feb. 2, 2022, published under WO 2022/167468 A1 on Aug. 11, 2022, designating the United States, which claims priority from German Patent Application Number 10 2021 200 989.1, filed on Feb. 3, 2021, which are hereby incorporated herein by reference in their entirety for all purposes.

FIELD

The present invention relates to a robot configured to recognize and pick up at least one predetermined object.

BACKGROUND

An autonomous robot able to recognize and localize objects on a freely determinable surface by means of a camera directed in the direction of travel of the robot through image recognition and an artificial neural network is known from the state of the art. The robot may pick up these objects fully automatically by means of a gripper arm and move them into an associated container.

SUMMARY

The object of the invention is to improve such a robot structurally and/or functionally.

The object is attained by a robot having the features of claim 1. Advantageous embodiments are the subject of the dependent claims.

Accordingly, the object is attained by a robot configured to recognize and pick up at least one predetermined object, the robot being configured in such a manner that the predetermined object is recognized and picked up in a work space below the robot.

The robot may be configured to autonomously move in a predefined area. The robot may be configured to move on a solid or unpaved ground. The robot may be configured to move fully electrically. Consequently, the robot may be used in a mobile manner in various areas of application.

The robot may comprise a battery and/or a rechargeable battery as an energy storage device for the fully electric locomotion of the robot. Additionally or alternatively, the robot may comprise a solar panel, in particular for charging the battery. The rechargeable battery and/or the battery of the robot may be installed in or on the robot in a removable manner. The rechargeable battery and/or the battery of the robot may be extendable.

The robot may be configured in such a manner that the predetermined object may be recognized and picked up on solid and/or unpaved ground in a work space below the robot. Accordingly, the ground may include solid ground, such as a paved surface and/or cobblestone, and/or unpaved ground, such as a grass surface, gravel, earth and/or sand.

Since the robot picks up the predetermined object in the work space of the robot, which is located in and below the robot, movements of the robot to pick up the predetermined object take place in the protected work space, which increases the safety of the use of the robot, in particular compared to conventional robots described above. Accordingly, the solution proposed here provides a protected work space for the robot arm. In addition, a better illumination of the work space may be achieved, in particular compared to conventional robots described above, which increases, inter alia, the accuracy of the recognition of the at least one predetermined object.

The robot may have a camera for recognizing the predetermined object, the camera being oriented in particular vertically to the ground below the robot.

The robot may have an object recognition algorithm, in particular based on an artificial neural network, the object recognition algorithm being configured to recognize the predetermined object based on image data detected by the camera.

The predetermined object(s) may be defined based on previously manually collected and/or specified object properties. The object properties may include an object type, such as crown caps and/or cigarette butts, dimensions of the object of the respective object type, and/or one or more colors of the object of the respective object type. If the robot recognizes a predetermined object based on the image data and the object properties, the robot may be configured to determine a position and/or an orientation of the predetermined object based on the image data. The artificial neural network of the object recognition algorithm may be trained by previously defined object properties on previously recorded example images of predetermined objects. In other words, the artificial neural network incorporated in the robot enables the recognition of predetermined objects. The neural network may be trained with the help of a data set of real images on which the predetermined objects may be seen. This enables the robot to distinguish the predetermined objects from other objects such as leaves, dirt or insects.

The robot may be configured to selectively pick up the predetermined object. That is, the robot is configured to selectively remove the predetermined objects and not to continuously and/or non-directionally generate a suction flow and suck up all objects located in a work space like a vacuum cleaner robot, for example. This selective or targeted picking up of predetermined objects prevents damage to surfaces or the ground and avoids unintentional removal of other objects, such as insects.

For picking up the predetermined object, the robot has an end effector and an adjusting unit to which the end effector is attached in a movable manner.

This means that since the predetermined object is picked up in a work space below the robot, the end effector and the adjusting unit are to be disposed there, as well. In other words, the end effector and the adjusting unit are disposed in a work space below the robot. The adjusting unit may be configured to move the end effector in at least two directions, preferably in three directions (i.e., X, Y and Z).

The end effector may be the last element of a kinematic chain by means of which the recognized, predetermined object may be removed or picked up.

The adjusting unit may have the end effector as an exchangeable component. The adjusting unit may be disposed in the work space of the robot in a movable manner. The adjusting unit may be a three-axis rail system. The adjusting unit may be an articulated arm. The adjusting unit may be configured to move the end effector in such a manner that the end effector can reach a collection container. The three-axis rail system may have belts and/or shafts connected to actuators for driving or moving the end effector. The articulated arm may have one or more articulations connected to articulation motors configured to move the articulations.

The work space may also be referred to as the area under the camera that is detectable by the camera. The work space may be covered by the adjusting unit. The camera may be positioned above the adjusting unit.

The end effector may comprise a mouthpiece, in particular a flexible mouthpiece, which is connected to a suction motor via a suction member, and/or a mechanical gripper.

The adjusting unit may be configured to place the mouthpiece of the suction member on a ground under a work space of the robot in such a manner that the mouth-piece encloses the predetermined object.

The robot may be configured to control the suction motor in such a manner that it generates a vacuum in the suction member when the mouthpiece is placed on the ground.

The adjusting unit may be configured to tilt the mouthpiece when the suction motor has created the vacuum in the suction member to suck in the predetermined object by means of the suction member.

In other words, the mouthpiece may be disposed in such a manner that it can be placed on the ground or floor below the robot by means of the adjusting unit. Conceivably, dimensions of the mouthpiece may be selected in such a manner that the mouthpiece can fully enclose the predetermined objects to be removed. The robot may be configured to control the suction motor in such a manner that it generates a vacuum in the suction member, in particular at the mouthpiece. The mouthpiece may be tilted, in particular by horizontal movement of the adjusting unit relative to the ground on which the mouthpiece is placed, and/or by the design of the mouthpiece and possibly vertical movement of the adjusting unit relative to the ground on which the mouthpiece is placed, with the result that the vacuum in the suction member generates an air flow that flows over the predetermined object to be removed that is enclosed by the mouthpiece and the predetermined object to be removed is sucked in.

The constructive design of the mouthpiece that enables the tilting thereof by the vertical movement of the adjusting unit, if applicable, may comprise a two-part mouthpiece, the two parts being vertically movable relative to each other. One of the two parts has a flat surface and receives the other of the two parts, which has a beveled surface. First, the part with the flat surface is placed on the ground in the manner described above and the vacuum is created in the suction member, in particular in the mouthpiece. Then the part with the flat surface is moved vertically upward, while the other of the two parts, which has the beveled surface, remains on the ground. Thus, the vacuum in the suction member generates an air flow in the manner described above, which flows over the predetermined object to be removed, which is enclosed by the part with the beveled surface, with the result that the predetermined object to be removed is sucked in.

The robot may have a particle separator, in particular an inertial separator, the mouthpiece being connected to the suction motor via the suction member and the particle separator.

The suction member may be designed in such a manner that it directs the generated air or suction flow into a chamber of the particle separator that is connected to a collection container. The particle separator may filter objects from the suction stream using the principle of inertia. The chamber may have an air inlet and outlet. The flap may be closed when the suction motor is generating the vacuum in the suction member. The flap may be open when there is ambient pressure in the suction member with the result that the aspirated predetermined object falls into the collection container. The collection container may be disposed within the robot and/or on the robot in an exchangeable manner.

The robot may comprise a drive unit, in particular a drive unit comprising at least one electric motor, which is configured to drive the robot in such a manner that the robot runs an in particular predetermined area.

The drive unit may be configured to drive the robot in such a manner that the robot runs the predetermined area autonomously and/or in a remote-controlled manner, in particular based on a user input received by the robot.

The robot may include an anti-theft device. The anti-theft device may be configured to emit an acoustic signal in a predetermined situation. The anti-theft device may be a siren. The anti-theft device may additionally or alternatively be configured to send an alert to a terminal device, such as a smartphone, in the predetermined situation.

In summary and in other words, the invention thus results in a robot that autonomously recognizes objects on a terrain and removes them selectively and in isolation. The robot may be used to clean solid and/or unpaved ground. The robot may be placed on a surface on a terrain for this purpose. The robot may move autonomously on the surface.

In particular, the robot may move in a fully electrical and battery-powered manner. The robot may recognize specific objects on the site. The robot may be equipped with a camera for this purpose. The camera may have object recognition software. An artificial neural network may recognize and classify predetermined objects based on the image data detected by the camera. The robot may recognize objects on paved and/or unpaved ground. The robot may have an adjusting unit with an end effector. The robot may selectively remove recognized objects by suction or grasping. The invention enables the recognition and removal of specific objects on solid or unpaved terrain. The invention may be used to selectively remove objects in isolation. The invention facilitates and optimizes the collection of objects, such as trash. Time-consuming and ineffective homogeneous removal of trash is avoided. The gentle removal of objects by suction or gripping avoids damage to the ground. The targeted removal of objects recognized by the artificial neural network avoids unwanted removal of other objects. The targeted removal of objects, in particular based on camera data, may avoid the destruction of microorganisms. The removal of only predetermined objects, as opposed to homogeneous removal where all objects located in the work space of the robot are collected or removed, avoids frequent emptying of the collection container and extends the duration of the uninterrupted cleaning operation of the robot.

BRIEF DESCRIPTIONS OF THE DRAWINGS

Hereinafter, an embodiment of the invention is described in more detail with reference to FIGS. 1 to 5.

DETAILED DESCRIPTION

Figure 1:
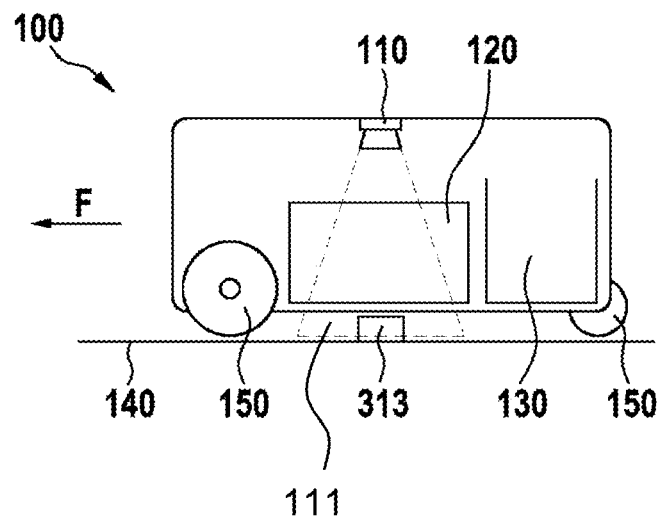
FIG. 1 is a schematic side view of a robot configured to recognize and remove predetermined objects.
Figure 2:
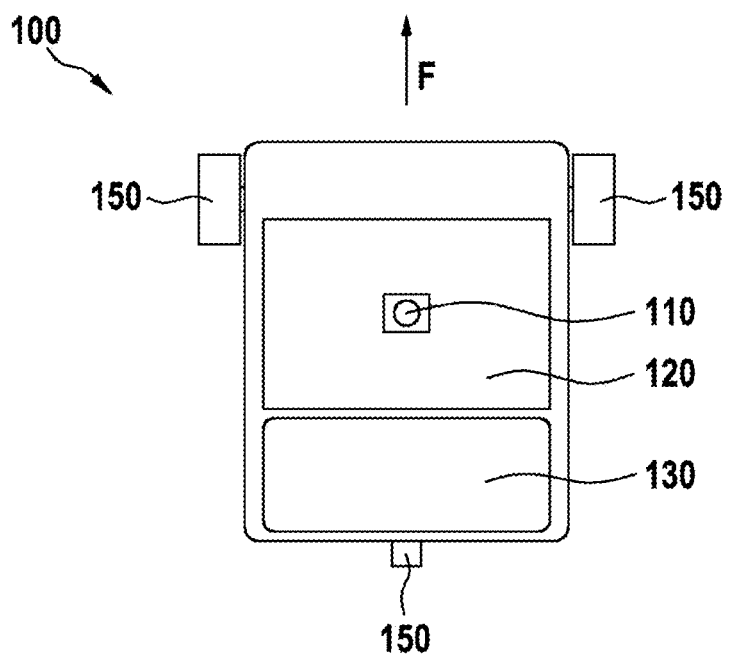
FIG. 2 is a schematic top view of the robot of FIG. 1.

In FIG. 1, a robot 100 is schematically shown in a side view, the robot 100 being configured to move on a ground 140 in a main travel or forward travel direction F. For this purpose, the robot 100 has at least three, in particular four, wheels 150 which are in contact with the ground 140 in the state shown in FIG. 1.

The wheels 150 of the robot 100 are connected to a drive unit (not shown) of the robot 100, which drives the wheels 150, in particular each of them, thus moving the robot 100 relative to or on the ground 140.

The drive unit is connected to an in particular replaceable and/or rechargeable energy storage unit (not shown) disposed in and/or on the robot 100, the energy storage unit providing drive energy for the drive unit.

The robot 100 is configured to detect predetermined objects 313, such as cigarette butts and/or crown caps, located on the ground 140 and to pick up the recognized predetermined objects 313.

For this purpose, the robot 100 comprises at least a camera 110, an adjusting unit 200, and an object pickup device connected to the adjusting unit.

The camera 110 is directed at the ground 140 and may be disposed essentially upright, i.e., vertical, above the ground 140. The camera 110 is disposed and oriented in such a manner that it can acquire or record, in particular continuously, image data of the ground 140 in a work space 120 of the robot 100, as indicated by the dashed lines in FIG. 1, which illustrates a viewing area of the camera 110.

By means of the camera 110, the robot 100 can recognize the at least one predetermined object 313 in the work space 120 below the robot 100 (shown at 111 in FIG. 1), determine its position, and output the determined position to the adjusting unit 200.

For this purpose, the camera 110 outputs the acquired image data to a control unit (not shown) of the robot 100, which processes the image data received from the camera 110 by means of an object recognition algorithm, which is configured to recognize the predetermined object 313 located in the work space 120 and to determine its position. The object recognition algorithm may comprise an artificial neural network trained to recognize the at least one predetermined object 313 based on the image data from the camera 110. Conceivably, the control unit may be a computing unit separate from the camera 110 and/or integrated in the camera 110.

The control unit subsequently outputs a control signal to the adjusting unit 200. More specifically, the control unit controls the adjusting unit 200 in such a manner that it moves the object pickup device to the position of the recognized predetermined object 313 determined by the control unit.

Accordingly, the adjusting unit 200 is configured to move the object pickup device to the position of the recognized predetermined object 313 based on the position of the recognized predetermined object 313 determined by means of the camera 110.

By means of the object pick-up device moved to the position of the recognized predetermined object 313 by the adjusting unit 200, the robot can selectively remove, i.e. pick up, the recognized predetermined object 313 from the ground 140 and receive the object 313 picked up from the ground 140 by means of the object pickup device in a collection container 130 disposed on and/or in the robot 100.

Figure 3:
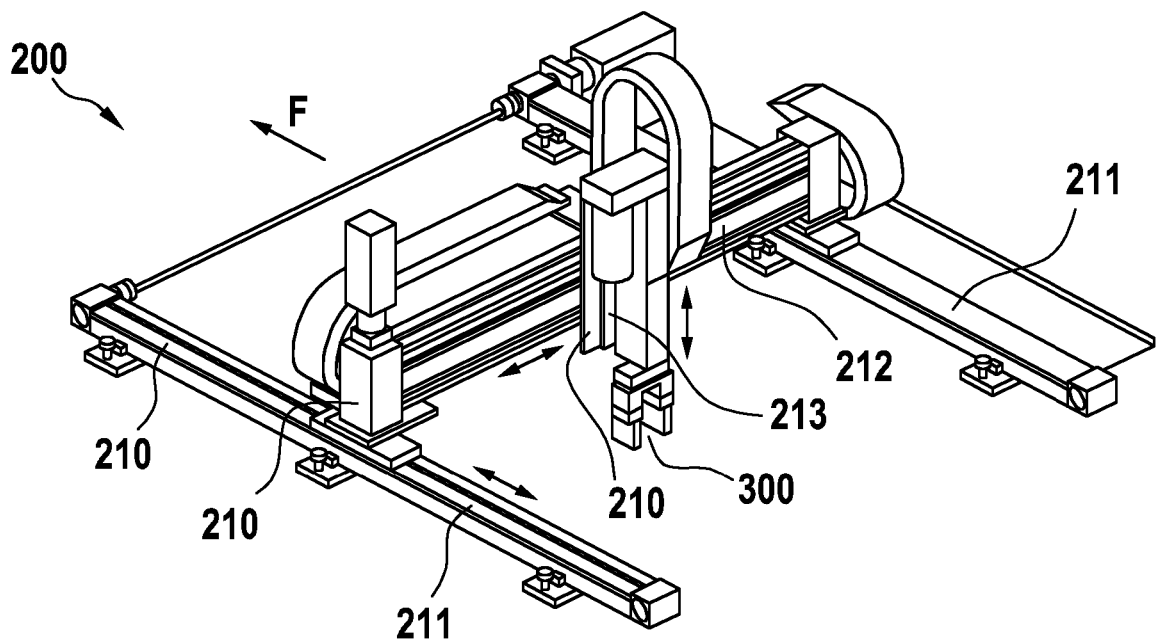
FIG. 3 is a schematic perspective view of an adjusting unit of the robot from FIGS. 1 and 2.

The adjusting unit 200 may be designed as a three-axis system 210 (see in particular FIG. 3) which comprises at least one, in particular two first rails 211, at least one second rail 212 and at least one third rail 213. The at least one first rail 211 may be essentially horizontal and parallel to the forward travel direction F of the robot 100.

The at least one second rail 212 may be essentially horizontal and perpendicular to the forward travel direction F of the robot 100 and may be mounted on the first rail 211 in such a manner that it can be moved in the forward travel direction F.

The at least one third rail 213 may be essentially vertical and perpendicular to the forward travel direction F of the robot 100 and may be mounted on the second rail 212 in such a manner that it can be moved perpendicular to the forward travel direction F of the robot 100.

An end effector 300, 312 may be mounted on the at least one third rail 213 in such a manner that it can be moved vertically in order to be moved by means of the adjusting unit 200 downward towards the ground 140 for picking up the recognized predetermined object 313 and upward away from the ground 140 after picking up the recognized predetermined object 313. The end effector may be a gripper 300, in particular a mechanical gripper (see in particular FIG. 3).

Figure 4:
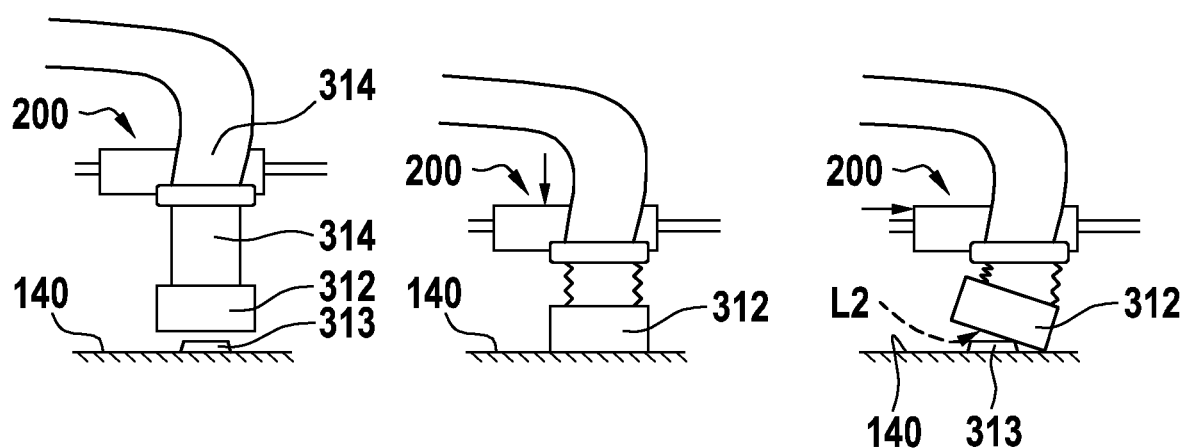
FIG. 4 is a schematic side view of a suction member connected to the adjusting unit of FIG. 3.
Figure 5:
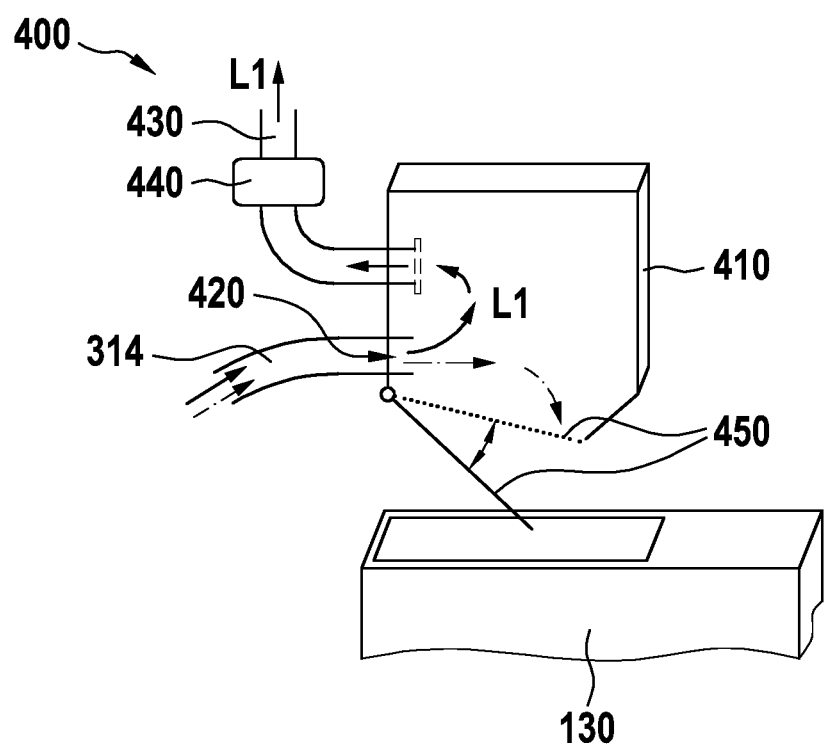
FIG. 5 is a schematic perspective view of a particle separator of the robot of FIGS. 1 and 2.

It is also conceivable to provide a mouthpiece 312 as end effector (see in particular FIG. 4). The mouthpiece 312 is connected to a suction motor 440 (see also FIG. 5), which is also controlled by the control unit described above, via a flexible suction member or hose 314 and a particle separator 400.

FIG. 4 shows a sequence of the picking up of the recognized predetermined object 313 using the end effector, which is a mouthpiece 312, which has an essentially round or circular cross-section, in three different stages (from left to right in FIG. 4).

Initially (see FIG. 4, left), the mouthpiece 312 is positioned vertically and essentially centrally above the recognized predetermined object 313 by means of the adjusting unit 200.

Subsequently, the adjusting unit 200 moves the mouthpiece 312 vertically downward in the direction of the recognized predetermined object 313, which is in particular located on the ground 140, with the result that the mouthpiece 312 encloses the recognized predetermined object 313 and is in contact with the ground 140 (see FIG. 4, center).

The robot 100, in this case the control unit described above, is configured to control the suction motor 440 in such a manner that it generates a vacuum in the suction member 314 and thus also in the mouthpiece 312 when or as soon as the mouthpiece 312 has been placed on the ground 140 or is in contact with the ground 140.

For this purpose, the suction motor 440 aspirates air L1 through a chamber 410 of the particle separator 400, which has an air inlet 420, via which the suction member 314 is connected to the chamber 410, and expels the aspirated air L1 via an air outlet 430. As soon as the suction motor 440 is switched on, i.e., as soon as the suction motor 440 aspirates the air L1, a flap 450 (see dashed line in FIG. 5) of the chamber 410 closes and the vacuum forms in the suction member 314.

After the suction motor 440 has generated the vacuum in the suction member 314, the mouthpiece 312 is tilted relative to the ground 140 by means of the adjusting unit 200, in particular by a horizontal movement of the adjusting unit 200 relative to the ground 140 and by static friction of the mouthpiece on the ground 140 (see FIG. 4, right).

Due to the vacuum generated in the suction member 314 by the suction motor 440, the tilting of the mouthpiece 312 causes a pressure compensation with respect to the ambient pressure, resulting in an air flow L2. This sudden air flow L2 caused by the tilting flows over the recognized predetermined object 313, and a suction effect associated therewith transports the recognized predetermined object 313 into the chamber 410 of the particle separator 400 via the suction member 314.

The recognized predetermined object 313 remains in the chamber 410 due to its comparatively high mass and inertia. Subsequently, the control unit switches off the suction motor 440, and the flap 450 of the chamber 410 opens with the result that the recognized predetermined object located in the chamber 410 falls into the collecting container 130 (see in particular FIG. 5) through an opening created by the opening of the flap 450.

Conceivably, the robot 100 may autonomously run an area, such as a lawn, stop for picking up the recognized predetermined object 313 as described above, and continue its travel after having picked up the recognized predetermined object 313.

However, it is also conceivable that the robot 100 picks up the recognized predetermined object 313 as it drives.

Furthermore, it is conceivable that the area that the robot 100 autonomously runs and cleans is defined or can be defined by user input, e.g., via a smartphone that can be connected to the robot 100.

The invention claimed is:

1. A robot configured to recognize and pick up at least one predetermined object, the robot being configured in such a manner that the predetermined object is recognized and picked up in a work space below the robot, wherein the robot comprises an end effector for picking up the predetermined object and an adjusting unit to which the end effector is attached in a linearly displaceable manner, the end effector and the adjusting unit being disposed in the work space below the robot; and wherein the work space is located in and below the robot.

2. The robot according to claim 1, wherein the robot comprises a camera for detecting the predetermined object, the camera being oriented vertical to the ground below the robot.

3. The robot according to claim 2, wherein the robot comprises an object recognition algorithm, wherein the object recognition algorithm based on an artificial neural network, the object recognition algorithm being configured to recognize the predetermined object based on image data detected by the camera.

4. The robot according to claim 1, wherein the robot is configured to selectively pick up the predetermined object.

5. The robot according to claim 1, wherein the end effector comprises a flexible mouthpiece, which is connected to a suction motor via a suction member, and/or a mechanical gripper.

6. The robot according to claim 5, wherein the robot comprises a particle separator, which is an inertial separator, the mouthpiece being connected to the suction motor via the suction member and the particle separator.

7. The robot according to claim 1, wherein the robot comprises a drive unit configured to drive the robot in such a manner that the robot runs in a particular predetermined area.

8. The robot according to claim 7, wherein the drive unit is configured to drive the robot in such a manner that the robot runs the area autonomously and/or in a remote-controlled manner, the area being predetermined based on a user input received by the robot.

9. A robot configured to recognize and pick up at least one predetermined object,
the robot being configured in such a manner that the predetermined object is recognized and picked up in a work space below the robot,
wherein the robot comprises an end effector for picking up the predetermined object and an adjusting unit to which the end effector is attached in a movable manner, the end effector and the adjusting unit being disposed in the work space below the robot; wherein the work space is located in and below the robot,
wherein the end effector comprises a mechanical gripper, and
wherein the adjusting unit is configured to place the mouthpiece of the suction member on a ground below a work space of the robot in such a manner that the mouthpiece encloses the predetermined object;
the robot is configured to control the suction motor in such a manner that it generates a vacuum in the suction member when the mouthpiece has been placed on the ground; and
the adjusting unit and/or the mouthpiece are constructively configured to tilt the mouthpiece when the suction motor has generated the vacuum in the suction member so as to suck in the predetermined object by the suction member.

* * * * *